(12) United States Patent
Steiner et al.

(10) Patent No.: US 10,140,167 B2
(45) Date of Patent: Nov. 27, 2018

(54) STATIC MESSAGE PLACEMENT IN QUEUES BASED ON AN APRIORI DEFINED PLACEMENT PLAN

(71) Applicant: FTS Computertechnik GmbH, Vienna (AT)

(72) Inventors: Wilfried Steiner, Vienna (AT); Günther Bauer, Vienna (AT)

(73) Assignee: FTS Computertechnik Gmbh, Vienna (AT)

( * ) Notice: Subject to any disclaimer, the term of this patent is extended or adjusted under 35 U.S.C. 154(b) by 0 days.

(21) Appl. No.: 15/511,866

(22) PCT Filed: Sep. 21, 2015

(86) PCT No.: PCT/AT2015/050233
§ 371 (c)(1),
(2) Date: Mar. 16, 2017

(87) PCT Pub. No.: WO2016/044871
PCT Pub. Date: Mar. 31, 2016

(65) Prior Publication Data
US 2017/0242738 A1   Aug. 24, 2017

(30) Foreign Application Priority Data
Sep. 22, 2014   (AT) .................. 50675/2014

(51) Int. Cl.
*G06F 9/46* (2006.01)
*G06F 9/54* (2006.01)

(52) U.S. Cl.
CPC .............. *G06F 9/546* (2013.01); *G06F 9/466* (2013.01); *G06F 2209/548* (2013.01)

(58) Field of Classification Search
CPC ..... G06F 9/546; G06F 9/466; G06F 2209/548
See application file for complete search history.

(56) References Cited

U.S. PATENT DOCUMENTS

2008/0133787 A1* 6/2008 Cassidy .............. G06F 13/4221
710/23
2008/0259966 A1* 10/2008 Baird .................... H04J 3/0632
370/503

(Continued)

*Primary Examiner* — Charles E Anya
(74) *Attorney, Agent, or Firm* — Eversheds Sutherland (US) LLP (57) ABSTRACT

An information exchange between at least two processes (FEED_PROC-1, FEED_PROC-2, CONSUME_PROC-1) communicating with each other using at least one queue (QUEUE-001) uses a placement plan for determining the order in which messages are placed into the queue. The information feeding processes (FEED_PROC-1, FEED_PROC-2) place pieces of information (MESG-001, MESG-002) into the queue (QUEUE-001), from where an information consuming process (CONSUME_PROC-1) sequentially consumes the pieces of information. The placement plan describes, for at least one possible value of identifying information contained in each of the pieces of information, a respective position (POS-001, POS-002) in the queue (QUEUE-001), such that the pieces of information (MESG-001, MESCG-002) or respective references thereto are placed into the queue according to positions in the queue (QUEUE-001) corresponding to the respective values of the identifying information in the pieces of information.

13 Claims, 11 Drawing Sheets

(56) References Cited

U.S. PATENT DOCUMENTS

| | | | |
|---|---|---|---|
| 2012/0294315 A1* | 11/2012 | Sukonik | H04L 49/901 370/412 |
| 2013/0061246 A1* | 3/2013 | Archer | G06F 9/546 719/313 |
| 2013/0081061 A1* | 3/2013 | Dice | G06F 9/52 719/314 |

* cited by examiner

STATIC MESSAGE PLACEMENT IN QUEUES BASED ON AN APRIORI DEFINED PLACEMENT PLAN

FIELD OF TECHNOLOGY

The field of the invention is the general area of information exchange in computer systems, in particular in those computer systems in which the temporal aspect of the information exchange is relevant, e.g., computer systems used for real-time applications and/or applications that demand reliable information exchange. Example application areas of the invention are the automotive, aerospace, space, or industrial automation industries, and in particular applications in these industries that demand exchange of information with good temporal quality and/or application in which the failure of message transmissions needs to be compensated (e.g., by repeated message transmission). For example, in one realization the invention is implemented in network equipment like Ethernet switches or routers and is used to reduce the transmission latency of high priority messages. In another realization several of the queues as following this invention are being implemented and configured in a way such that the end-to-end delays from one sender to a multitude of receivers is balanced (e.g., almost equal).

SUMMARY OF INVENTION

The invention relates to a method for performing information exchange and a device implementing such method as described in the independent claims. The dependent claims describe further aspects and developments of the invention.

The invention improves the exchange of information between two processes or a multitude of processes in a computer system. For example, processes can run on different cores of a multi-core computer chip and can communicate with each other, processes may also execute on several nodes in a distributed computer system and communicate with each other using a network, processes may also execute on ports in a starcoupler SC (FIG. 1b) in a network. However, as concerns the invention, processes may execute also on other entities that exchange information. Information is exchanged in chunks as pieces of information that are herein referred to as "messages".

A typical way to exchange information between processes is the use of queues. Information feeding processes add messages into one or many queues that are being part of or are interfacing with information consuming processes. Furthermore, messages are typically consumed by the information consuming processes sequentially. It is also typical that the messages from the information feeding processes are being placed in the one or many queues in the order as they are being fed. As a result, the information consuming processes typically consume the messages from queues in a so called first-in first-out FIFO principle. Furthermore, once messages are being placed into queues, it is possible to re-order the messages in the one or many queues. An information feeding process might receive the messages, which it adds into the queue(s), from a source (possibly with modifications, "information forwarding process") or generate the message based on internal and/or external information and/or signals ("information producing process"). Likewise, an information consuming process consumes the messages, such as by storing and/or forwarding and/or deleting a message, possibly after processing the message according to some modification process, depending on the message and other conditions.

The invention presents a novel method on how to place messages in one or many queues, e.g., to avoid re-ordering after placement into the one or many queues. In particular, the method makes use of an a priory specified placement plan PP that defines at which positions POS in the queue messages MESG as produced by information feeding processes are being placed. A priori means that the placement plan PP or parts of it are locally stored in the device that implements the one or many queues. In one realization, the information consuming process starts, pauses, stops, and/or resumes the consumption of messages from the one or many queues at a priori defined points in time. In one realization, time is synchronized in two or many entities that execute the processes in the computer system.

Furthermore, the invention also presents devices, for example a starcoupler, and a DMA (direct memory access) controller, that implement one or several aspects of the method.

BRIEF DESCRIPTION OF FIGURES

In the following we discuss several exemplary embodiments of the invention with reference to the attached drawings. It is emphasized that these embodiments are given for illustrative purpose and are not to be construed as limiting the invention.

EXEMPLARY EMBODIMENTS

Figure 1:
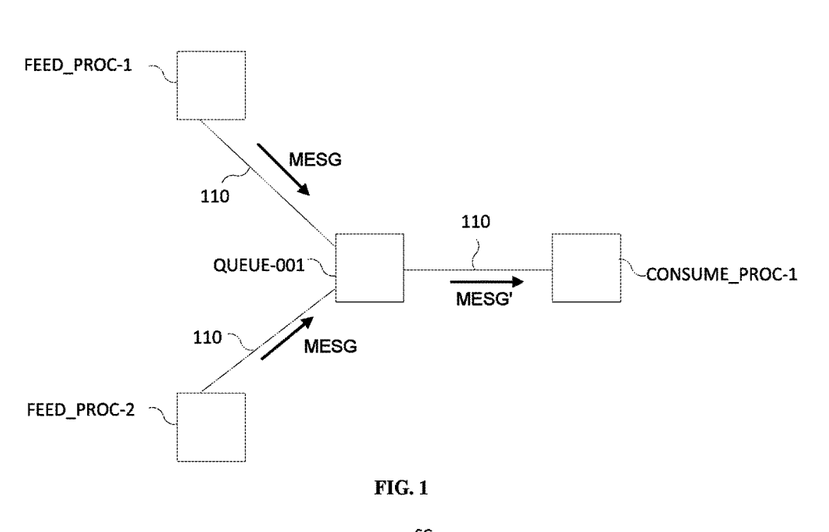
FIG. 1 depicts an example of a system having two information feeding processes, a queue, and an information consuming process.

FIG. 1 depicts an example of information exchange in a computer system. The example consists of two information feeding processes FEED_PROC-1, FEED_PROC-2 connected via information channels 110 to a single queue QUEUE-001. The feeding processes use the information channels 110 to send messages MESG to the queue QUEUE-001. FIG. 1 furthermore depicts a single information consumer process CONSUME_PROC that consumes the messages MESG' from the queue QUEUE-001. We use the concept of message transmission only for illustrating purposes for this transfer of information from the information feeding processes FEED_PROC-1, FEED-PROC-2 to the queue QUEUE-001 and for the information transfer from the queue QUEUE-001 to the consumer process CONSUME_PROC-1. In example realizations, the information exchange over the information channels 110 may be realized in various ways, e.g., it can he a copying process of information from one memory location to another memory location, it can involve information transport over a PCIe bus system, or similar techniques. For clarity, we also note that the processing of the messages MESG by the queue QUEUE-001 does not necessarily mean that at any point in time the complete message MESG is added to the datastructure that implements the queue QUEUE-001, but rather only representative information for the respective messages MESG may be stored in the queue QUEUE-001 with a reference of the remaining message MESG's contents being locally stored in a data-structure separated from the datastructure of the queue QUEUE-001. In other implementations, the number of information feeding processes may be different; in particular, there may be only one, or three, or more information feeding processes.

Figure 1A:
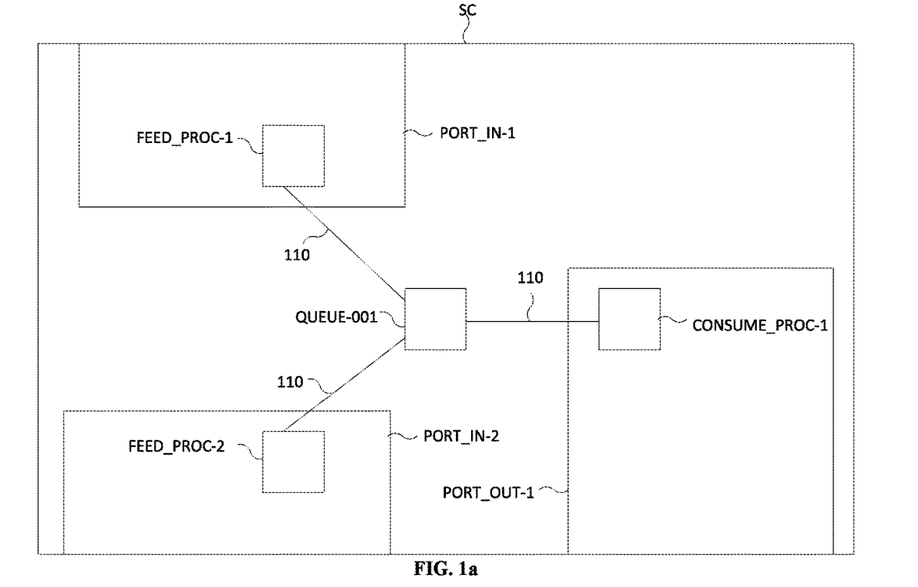
FIG. 1a depicts an example of a startcoupler SC implementing information feeding processes at incoming ports, a queue, and information consuming processes at outgoing ports.
Figure 1B:
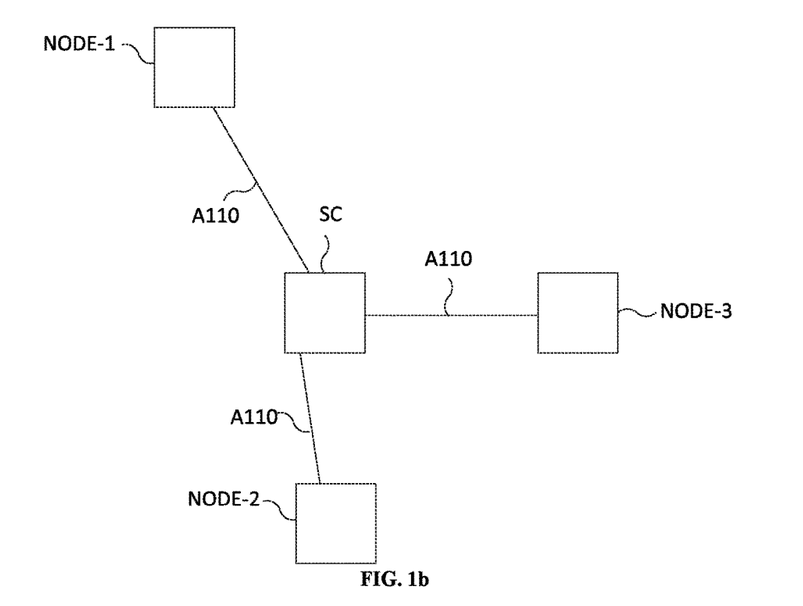
FIG. 1b depicts an example computer network including nodes communicating with each other using a starcoupler.

FIG. 1a depicts an example how the invention may be realized in a starcoupler SC of a computer network, for example an Ethernet switch. An example computer network is depicted in FIG. 1b—in this example network three nodes NODE-1, NODE-2, NODE-3, exchange messages MESG with each other using a starcoupler SC towards which the nodes are connected with bi-directional communication links A110. In this example realization of the invention in the starcoupler SC, the information feeding processes FEED_PROC-1, FEED_PROC-2 can operate on incoming ports PORT_IN-1, PORT_IN-2 of the starcoupler SC, and the information consumer process CONSUME_PROC-1 can operate at an outgoing port PORT_OUT-1 of the starcoupler SC. In such an example, the information feeding processes FEED_PROC-1, FEED_PROC-2 receive Ethernet messages MESG on the incoming ports PORT_IN-1, PORT_IN-2 and feed them to the queue QUEUE-001 from where the messages are consumed by the information consuming process CONSUME_PROC-1 at the outgoing port PORT_OUT-1, which will then forward the Ethernet messages MESG to other devices (not shown) in the network.

Figure 1C:
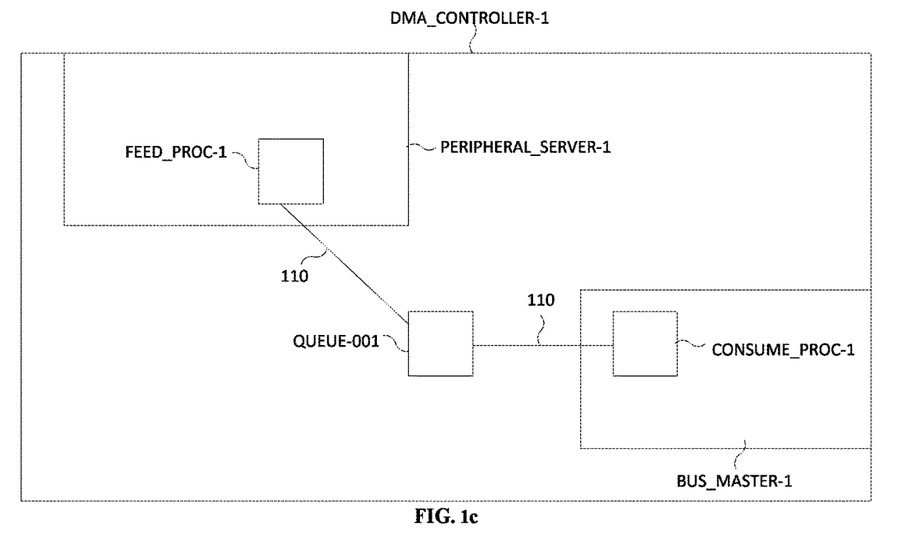
FIG. 1c depicts an example of a DMA controller implementing an information feeding process, a queue, and an information consuming process.
Figure 1D:
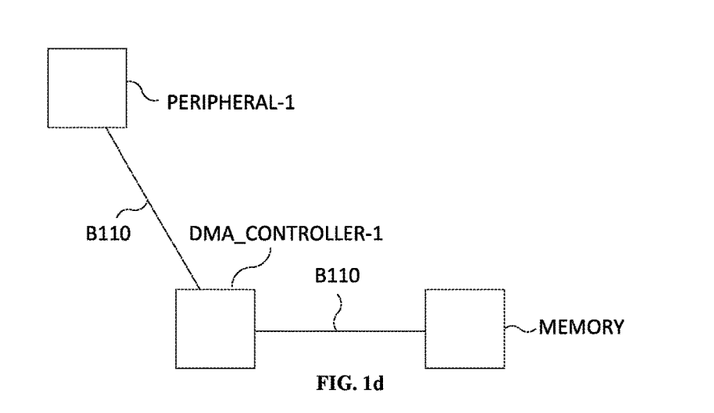
FIG. 1d depicts an example application of the DMA controller depicted in FIG. 1c connecting a peripheral device to a memory.

FIG. 1c depicts an example how the invention may be used to realize a direct memory access (DMA) controller subsystem of a computer system. An example computer system is depicted in FIG. 1d in this example computer system a peripheral unit PERIPHERAL-1 exchanges messages MESG with the computer system's main memory MEMORY. PERIPHERAL-1 and MEMORY arc connected to the DMA_CONTROLLER with communication links B110. In this example realization of the invention in a DMA controller, the information feeding process FEED_PROC-1 interfaces via PERIPHERAL_SERVER-1 to a peripheral unit PERIPHERAL-1 of the computer system, and the information consumer process CONSUME_PROC-1 implements the bus master functionality BUS_MASTER-1 of the DMA controller. In such an example, the information feeding process FEED_PROC-1 receives messages MESG via the PERIPHERAL_SERVER-1 from a peripheral unit PERIPHERAL-1 of the computer system and feeds them to the queue QUEUE-001 from where the messages MESG are consumed by the information consuming process CONSUME_PROC-1 of the BUS_MASTER-1, which will transfer the messages MESG to the computer system's main memory MEMORY.

Figure 1E:
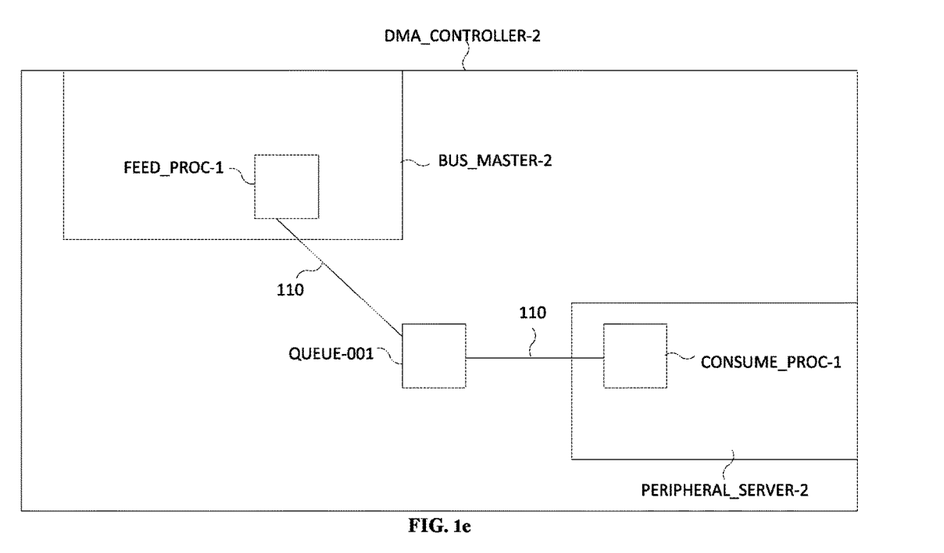
FIG. 1e depicts a DMA controller implementing an information feeding process, a queue, and an information consuming process.
Figure 1F:
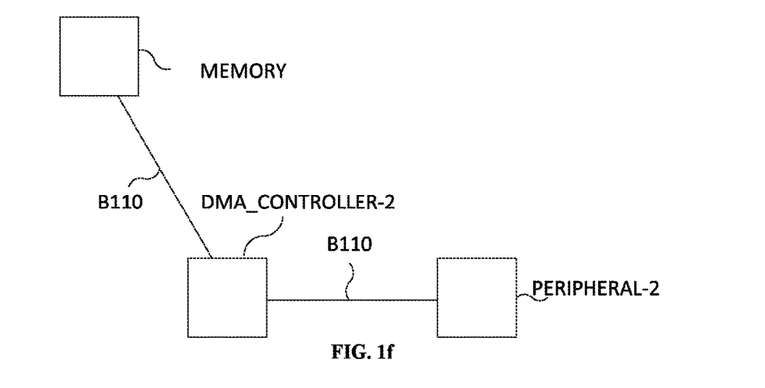
FIG. 1f depicts an example application of the DMA controller depicted in FIG. 1e connecting a peripheral device to a memory.

FIG. 1e and FIG. 1f demonstrate how to transfer messages MESG from the computer system's main memory MEMORY to a peripheral unit PERIPHERAL-2: in this case, BUS_MASTER-2 contains the information feeding process FEED_PROC-1, which receives messages MESG from the main memory MEMORY and feeds them to the queue QUEUE-001. From there the messages MESG will be transferred to the peripheral unit PERIPHERAL-2 by means of the PERIPHERAL_SERVER-2, which contains the information consuming process CONSUME_PROC_1.

Figure 2:
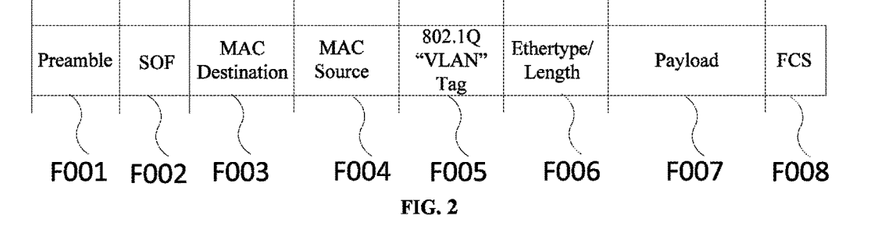
FIG. 2 depicts an Ethernet frame format.

FIG. 2 depicts the Ethernet frame format as an example of the inner structure of messages MESG fed to the queue QUEUE-001 and consumed from the queue QUEUE-001. As depicted, an Ethernet frame consists of the following elements: a preamble F001, the start of frame delimiter F002, the MAC Destination Address F003, the MAC Source Address F004, an optional 802.1Q VLAN Tag F005, an Ethertype/Length field F006, a Payload F007, as well as an Frame Check Sequence F008. The MESG column in FIG. 3 refers to message identifiers. Typically a defined set of bits in the Ethernet frame are used as such an identifier. For example, the MAC Destination Address F003, the MAC Source Address F004, the 802.1Q WAN tag F005, and the Ethertype/Length field F006, or parts of these fields can be used as message identifier for a given Ethernet frame. Likewise, for IP (Internet Protocol) messages the IP header or parts of the IP header can be used to identify a message. Likewise, for UDP (User Datagram Protocol) messages the UDP header or parts of the UDP header can be used to identify a message. Furthermore, device-specific aspects can be used as message identifier or in addition for identification for messages. E.g., in the example realization of the invention in an starcoupler, e.g., an Ethernet switch, also the port identity on which the Ethernet has been received can be used (in addition) to identify a message MESG.

Figure 3:
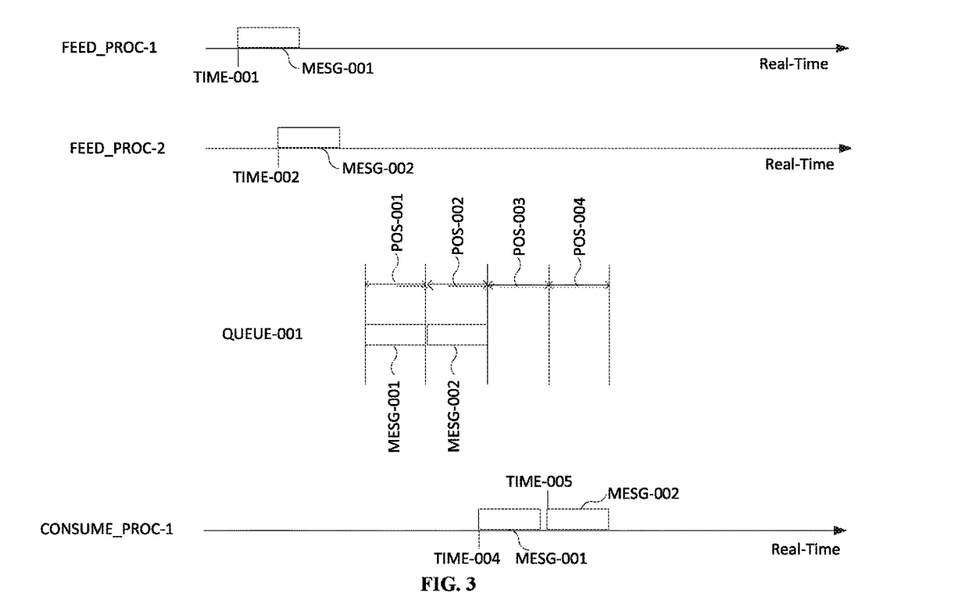
FIG. 3 depicts an example scenario of how messages are typically filled into a queue and consumed from the queue by an information consuming processes.

FIG. 3 depicts an example scenario of how messages MESG with message identifiers MESG-001, MESG-002 are typically filled into a queue QUEUE-001 by information feeding processes FEED_PROC-001, FEED-PROC-002 and consumed from the queue QUEUE-001 by information consuming processes CONSUME_PROC-001. As depicted FEED-PROC-001 sends its message identified as MESG-001 to the queue QUEUE-001 at time TIME-001 and FEED-PROC-002 sends its message identified as MESG-002 to the QUEUE-001 at time TIME-002. The messages identified as MESG-001, MESG-002 are added to the queue QUEUE-001 in the order of their arrival. That means, message identified as MESG-001 will be placed at position POS-001 in the queue QUEUE-001 and message identified as MESG-002 will be placed in the queue QUEUE-001 at position POS-002. When the information consuming process CONSUME-PROC-001 starts to consume the messages identified as MESG-001, MESG-002 from the queue QUEUE-001 it will do so by starting at the first positon POS-001 and sequentially consuming the messages from the queue QUEUE-001 with increasing positions (i.e., POS-001 followed by POS-002, POS-002 followed by POS-003, etc.).

Figure 4:
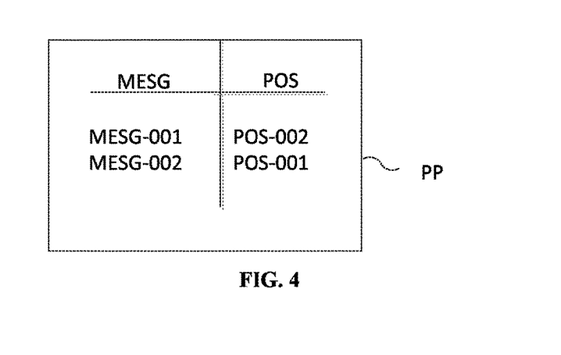
FIG. 4 depicts an example of a placement plan PP.

FIG. 4 depicts an example of a placement plan PP. It describes, for a set of messages MESG identified by their message identifier, position POS at which the respective message shall be placed in a queue QUEUE depending on the respective message type as specified by identifying information contained within the message identifier. In particular, the placement plan PP in FIG. 4 provides entries for messages identified as MESG-001 and MESG-002 and assign them the positions POS-002 and POS-001. The placement plan PP may be locally stored in the device implementing the queue QUEUE, for example in local memory.

Figure 4A:
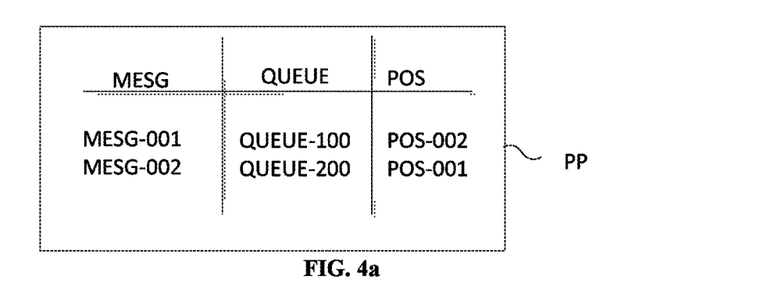
FIG. 4a depicts another example of a placement plan PP.

FIG. 4a depicts another example of a placement plan PP. It describes, for an implementation with several queues QUEUE-100, QUEUE-200, for a set of messages MESG identified by their message identifier, position POS at which the respective message shall be placed in the respective queues QUEUE-100, QUEUE-200 depending on the respective message type as specified by identifying information contained within the message identifier. In particular, the placement plan PP in FIG. 4a provides entries for messages identified as MESG-001 and MESG-002 and assigns them the positions POS-002 and POS-001 in the respective queues QUEUE-100, QUEUE-200. The queues are read out be respective information consuming processes, for instance one for each queue; the queues may also supply one (or several) common information consuming process. The placement plan PP may be locally stored in the device implementing the queues QUEUE-100, QUEUE-200, for example in local memory.

Figure 5:
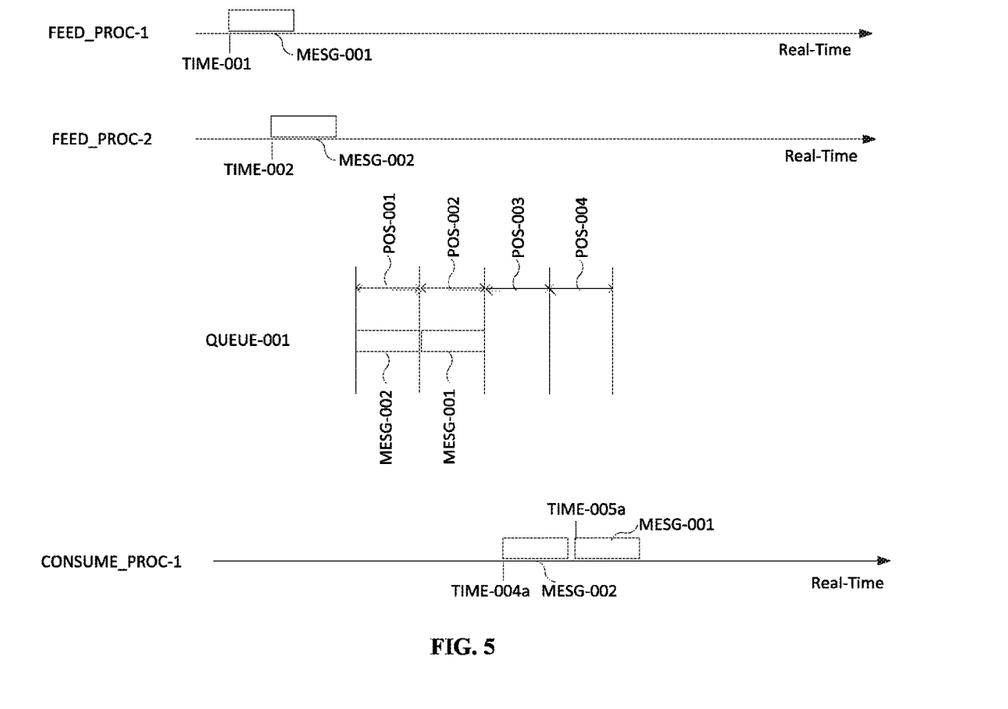
FIG. 5 depicts an example information exchange in a system using a placement plan.

FIG. 5 depicts an example information exchange in a system SYSTEM. Again, a first information feeding process FEED_PROC-001 sends a message identified as MESG-001 to the queue QUEUE-001 and a second information feeding process FEED_PROC-002 sends a message identified as MESG-002 to the queue QUEUE-001. Now, in contrast to the state-of-the-art, the messages identified as MESG-001, MESG-002 are not being placed into the queue QUEUE-001 in the order that they are provided to the queue QUEUE-001, but rather according the placement plan PP as described in FIG. 4. Now, when the information consuming process CONSUME-PROC-001 starts to consume the messages identified as MESG-001, MESG-002 from the queue QUEUE-001 it will do so by starting at the first positon POS-001 and sequentially consuming the messages from the queue QUEUE-001 with increasing positions (i.e., POS-001 followed by POS-002, POS-002 followed by POS-003, etc.). Consequently, as the messages are not being placed in the queue QUEUE-001 in accordance with their arrival time at the queue QUEUE-001, but rather in accordance with the placement plan PP (as depicted in FIG. 4), the information consuming process CONSUME-PROC-001 will now consume message identified as MESG-002 first, followed by the consumption of message identified as MESG-001.

In an example realization, the information consuming process CONSUME_PROC-1 will be started at TIME-004a, where TIME-004a is a point in a timebase that is used to synchronize several processes PROC to each other. For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

In an example realization, at least one of information feeding processes FEED_PROC-1, FEED_PROC-2 will be started at respective times TIME-001, TIME-002, where TIME-001, TIME-002 are points in a timebase that is used to synchronize several processes to each other, For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

Figure 6:
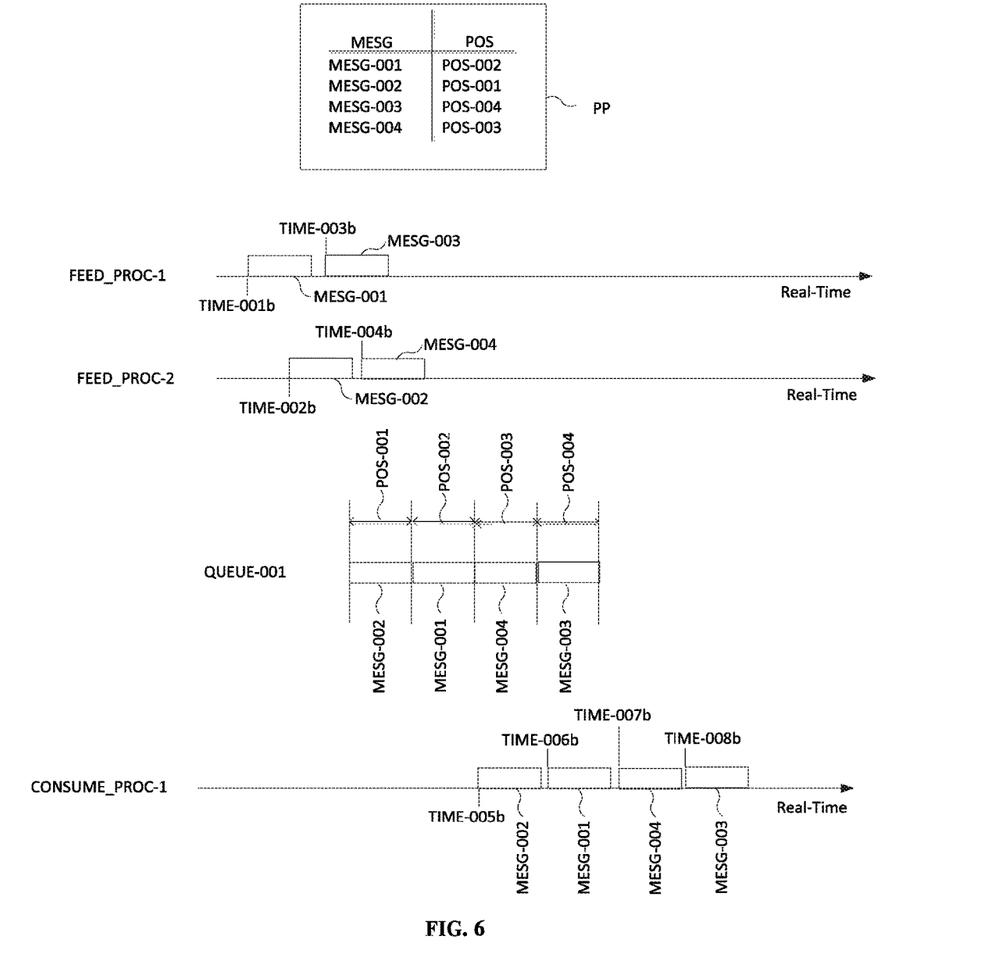
FIG. 6 depicts another example of a placement plan PP and its application in an example of information exchange.

FIG. 6 depicts another example of a placement plan PP and its application in an example of information exchange. In this example, again, two information feeding processes FEED-PROC-001 and FEED-PROC-002 feed messages identified as MESG-001, MESG-002, MESG-003, MESG-004 into the queue QUEUE-001. As depicted the messages are being placed in the queue QUEUE-001 according the placement plan PP.

In an example realization, the information consuming process CONSUME_PROC-1 will be started at TIME-005b, where TIME-005b is a point in a timebase that is used to synchronize several processes PROC to each other. For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

In an example realization, at least one information feeding process FEED_PROC-1, FEED_PROC-2 will be started at at least one of times TIME-001b, TIME-002b, TIME-0003b, TIME-004b, respectively, where TIME-001b, TIME-002b, TIME-0003b, TIME-004b are points in a timebase that is used to synchronize several processes to each other. For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

Figure 7:
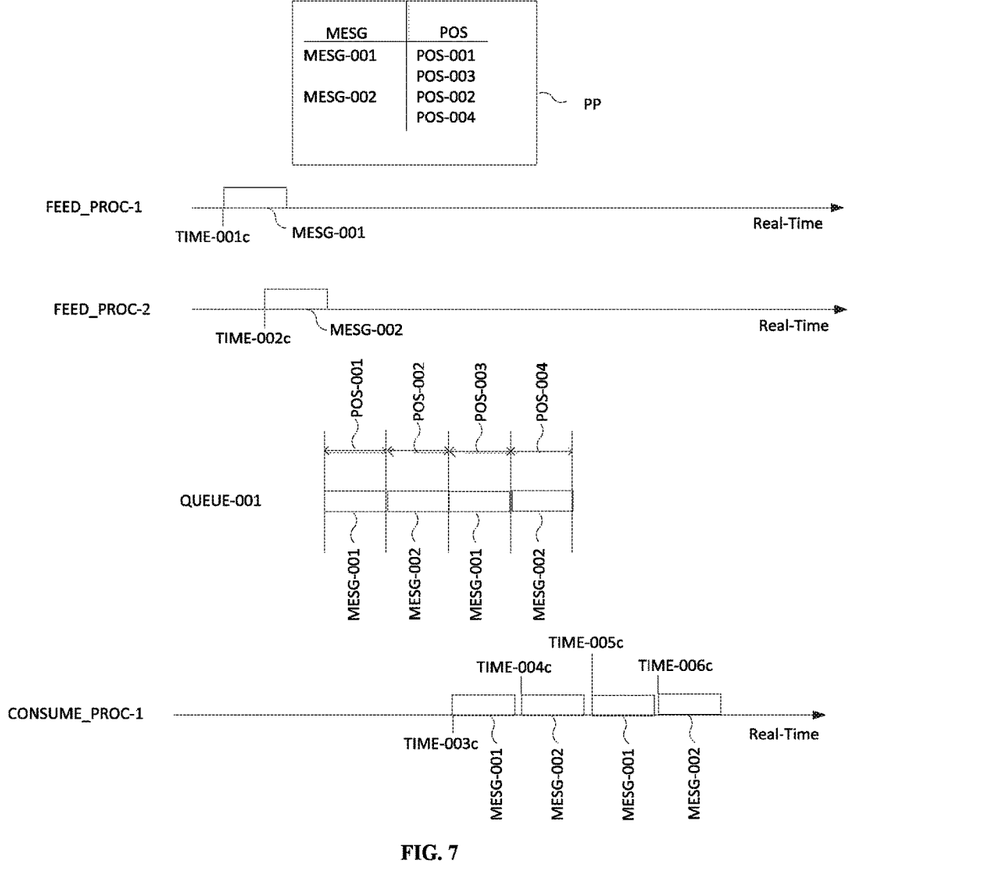
FIG. 7 depicts another example of a placement plan PP and its application in an example of information exchange.

FIG. 7 depicts another example of a placement plan PP and its application in an example of information exchange. In this example, each of the messages identified as MESG-001, MESG-002 are being placed twice in the queue QUEUE-001. In an example realization of the invention in a starcoupler SC, this mechanism causes the outgoing port PORT_OUT-1 of the SC that executes the information consuming process CONSUME_PROC-1 to send each of the messages identified as MESG-001, MESG-002 twice. Such a mechanism improves the reliability of message transmission, i.e., in case that the first transmission of a message identified as MESG-001 or MESG-002 is corrupted, the corruption of a first message is compensated by the second transmission of the respective message identified as MESG-001 or MESG-002. In the general case a message MESG can be added at one, two, or more positions in the queue QUEUE.

In an example realization, the information consuming process CONSUME_PROC-1 will be started at TIME-003c, where TIME-003c is a point in a timebase that is used to synchronize several processes PROC to each other. For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

In an example realization, at least one information feeding process FEED_PROC-1, FEED_PROC-2 will be started at respective times TIME-001c, TIME-002c, where TIME-001c, TIME-002c, are points in a timebase that is used to synchronize several processes to each other. For example in a computer network as depicted for example in FIG. 1b, clock synchronization protocols like IEEE 1588. IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

Figure 8:
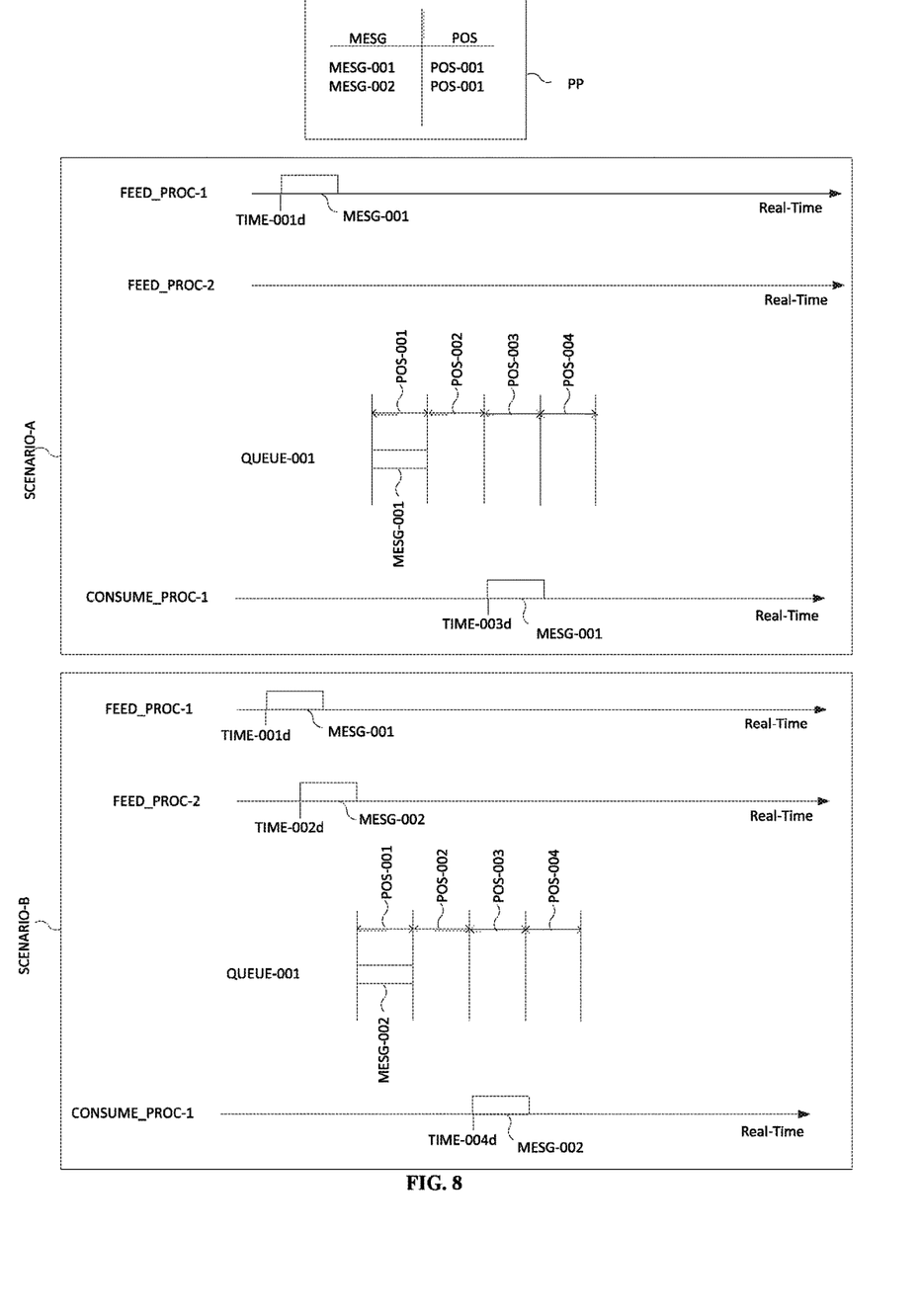
FIG. 8 depicts another example of a placement plan PP and its application in two scenarios of information exchange.

FIG. 8 depicts another example of a placement plan PP and its application in two scenarios of information exchange SCENARIO-A and SCENARIO-B. In this case, the placement plan assigns two messages identified by MESG-001 and MESG-002 the same positon POS-001 in the queue QUEUE-001. The effect of this assignment in the PP is described in two scenarios.

In scenario SCENARIO-A only one of the messages, the message identified by MESG-001 is fed into the queue QUEUE-001. Thus, the consumer process CONSUME_PROC-1 consumes the message as identified by MESG-001 from the queue QUEUE-001.

In scenario SCENARIO-B both messages as identified by MESG-001, MESG-002 are fed to the queue by the information feeding processes FEED_PROC-1 and FEED_PROC-2 respectively. As both messages have the same position POS-001 assigned in the queue QUEUE-001 the queue QUEUE-001 needs to decide which message shaft be maintained at POS-001. In this scenario the queue QUEUE-001 uses a replacement strategy in which the queue QUEUE-001 will replace the message identified as MESG-001 at POS-001 with the later received message as identified by MESG-002, before the message as identified by MESG-001 is being consumed by the information consuming process CONSUME_PROC-1. Consequently, the information consumer process CONSUME_PROC-1 will consume only the message as identified by MESG-002.

In general a queue QUEUE can implement various replacement strategies, e.g., use the first, second, or last message.

In an example realization, the information consuming process CONSUME_PROC-1 will be started at TIME-003b (SCENARIO-A) or TIME-004d (SCENARIO-B), where TIME-003d/TIME-004d are points in a timebase that is used to synchronize several processes PROC to each other. The times TIME-003d, TIME-004d may be equal or different, depending on the application case. For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

In an example realization, at least one information feeding processes FEED_PROC-1, FEED_PROC-2 will be started at at least one TIME-001d, TIME-002d, where TIME-001d, TIME-002d are points in a timebase that is used to synchronize several processes PROC to each other. For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

Figure 9:
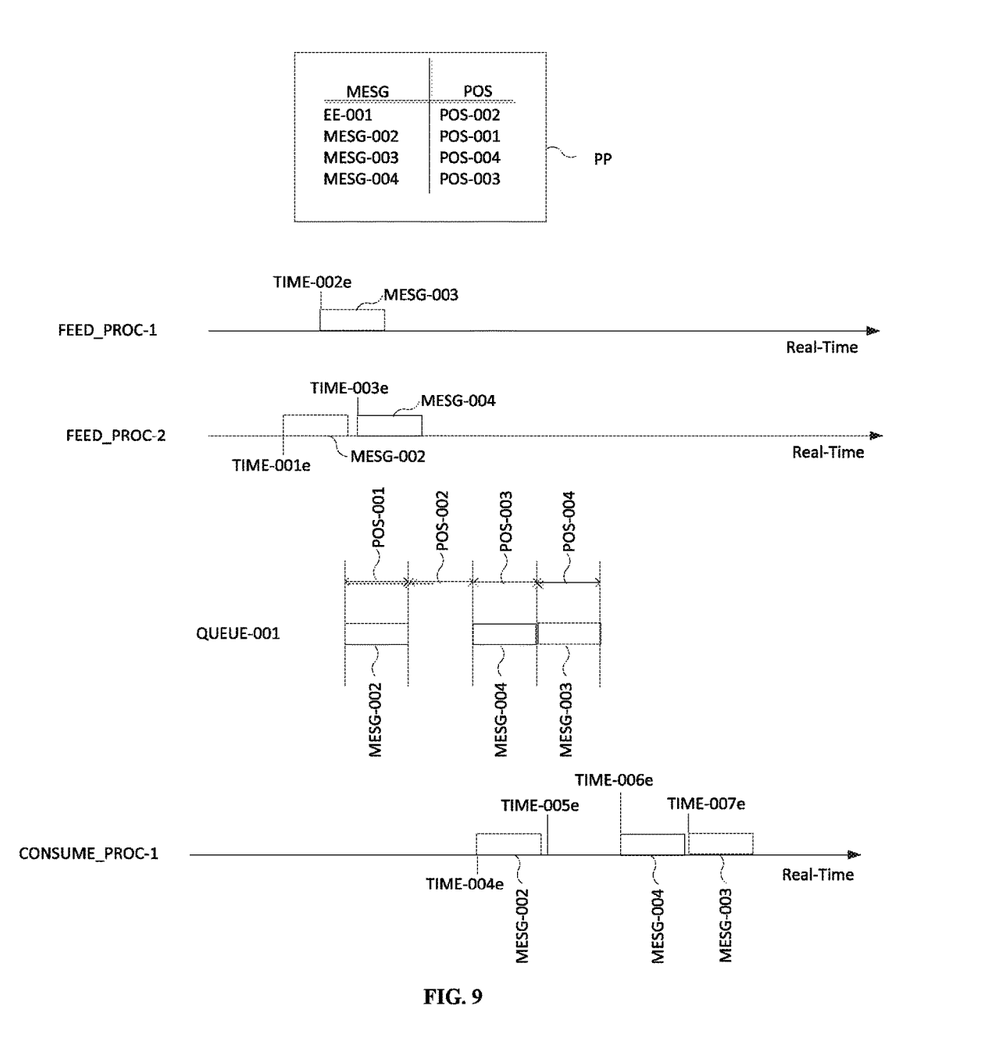
FIG. 9 depicts another example of a placement plan PP and its application in an example of information exchange.

FIG. 9 depicts another example of a placement plan PP and its application in an example of information exchange. Again, in this example two information feeding processes FEED_PROC-1, FEED_PROC-2 feed messages identified as MESG-002, MESG-003, MESG-004 into a queue QUEUE-001. The messages are being placed in the queue QUEUE-001 according the placement plan PP. In this example realization the placement plan PP also describes an empty entry EE-001, in this case at position POS-002. The purpose of the empty entry EE-001 is to pause the information consumer process CONSUME_PROC-1 in its sequential consumption of the messages MESG in the queue QUEUE-001. As depicted in this scenario, after consumption of the message identified as MESG-002, the consumption is paused at TIME-005e and only resumed at TIME-006e with the next message in the queue—identified as MESG-004.

In an example realization, the information consuming process CONSUME_PROC-1 will be started at TIME-004e, where TIME-004e is a point in a timebase that is used to synchronize several processes PROC to each other. For example in a computer network as depicted for example in FIG. 1b, clock synchronization protocols like IEEE 1588, IEEE 802.1AS, and/or SAE AS6802 can be used to establish and maintain a synchronized timebase between the nodes NODE-1, NODE-2, NODE-3 and the starcouplers SC and the respective information feeding processes FEED_PROC-1, FEED_PROC-2 and information consumer processes CONSUME_PROC-1.

In an example realization, at least one information feeding processes FEED_PROC-1, FEED_PROC-2 will be started at least one TIME-001c, TIME-002c, TIME-0003c, where TIME-001e, TIME-002e, TIME-0003e are points in a timebase that is used to synchronize several processes PROC to each other. For example in a computer network as depicted for example in FIG. 1b, clock synchronization protocols like IEEE 1588. IEEE 802.1AS, and/or SAE AS6802 can be used to establish and maintain a synchronized timebase between the nodes NODE-1 NODE-2, NODE-3 and the starcouplers SC and the respective information feeding processes FEED_PROC-1, FEED_PROC-2 and information consumer processes CONSUME_PROC-1.

Figure 10:
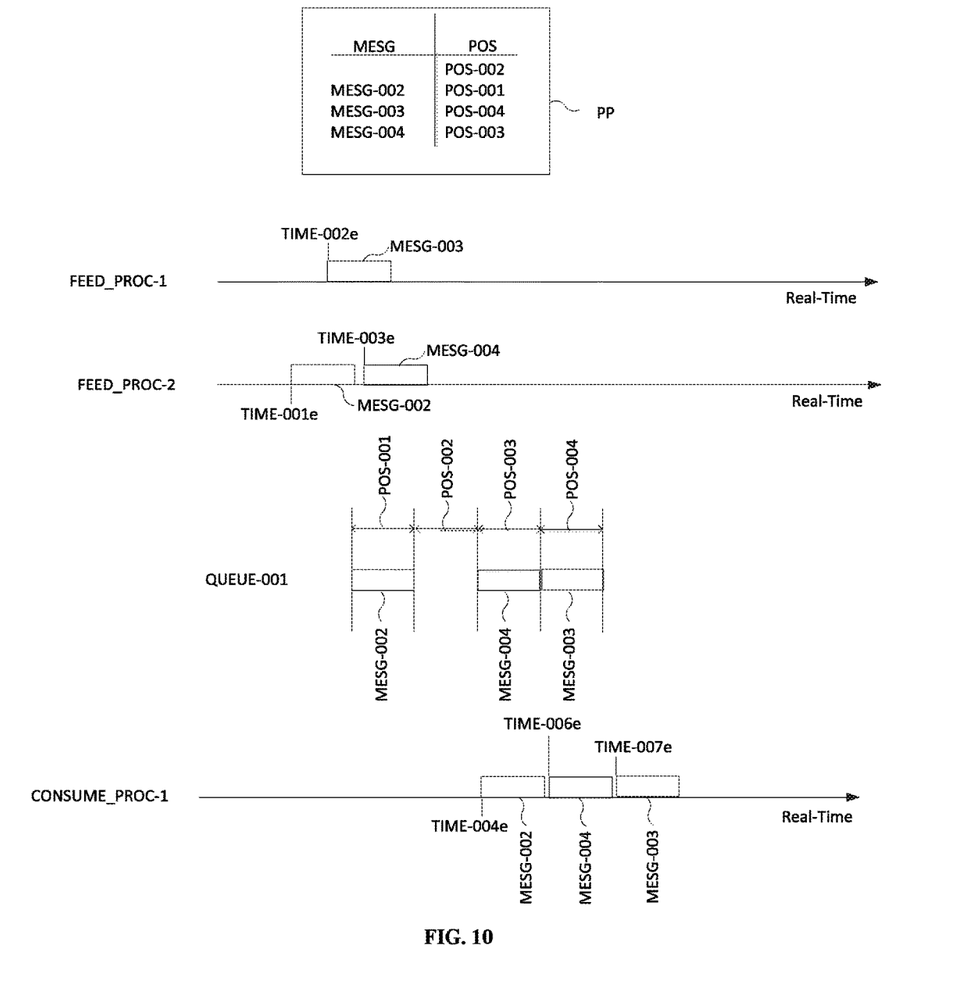
FIG. 10 depicts another example of a placement plan PP and its application in an example of information exchange.

FIG. 10 depicts another example of a placement plan PP and its application in an example of information exchange. This example is almost the same as depicted in FIG. 9, with the only difference of the absence of the empty entry EE-001 in the placement plan PP. As depicted in FIG. 10, the consequence of the missing empty entry EE-001 is that the information consumer process CONSUME_PROC-1 will not pause and immediately continue with its sequential processing of the messages identified by MESG-004 after consumption of the message as identified by MESG-002.

Figure 11:
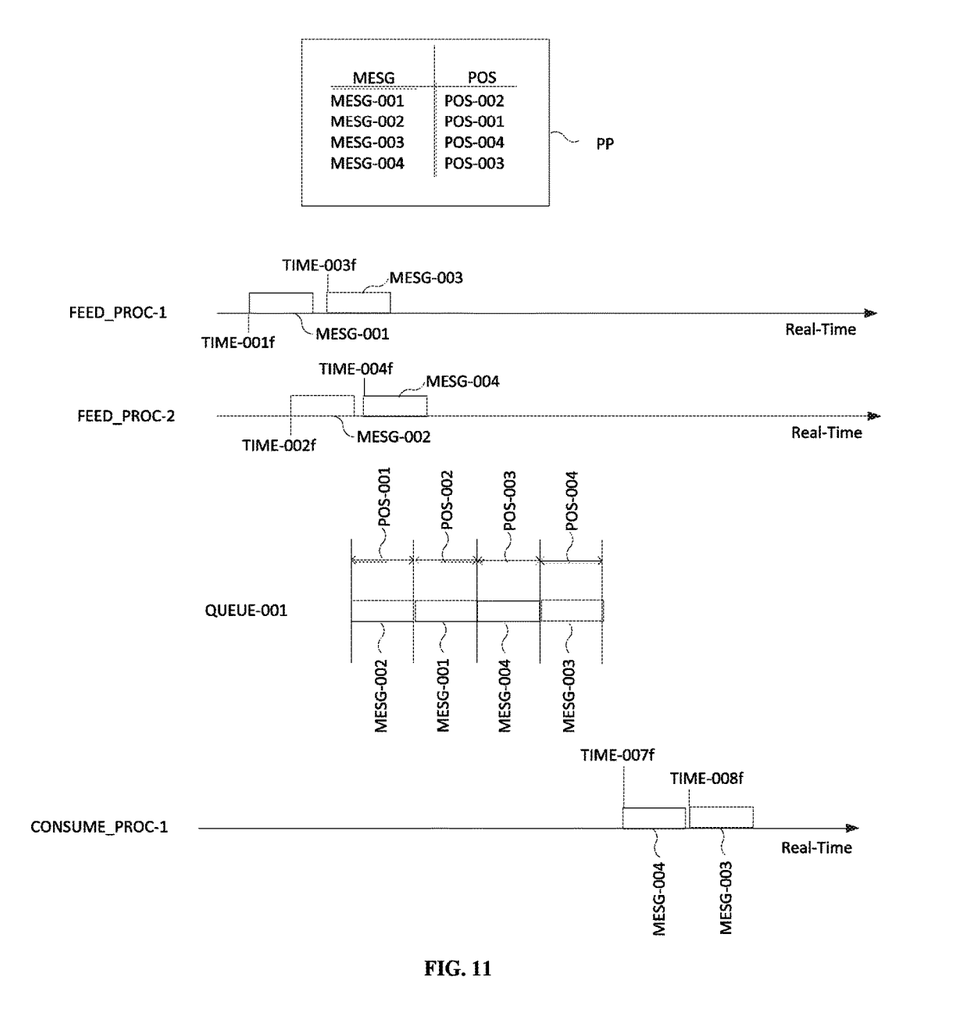
FIG. 11 depicts another example of a placement plan PP and its application in an example of information exchange.

FIG. 11 depicts another example of a placement plan PP and its application in an example of information exchange. In this example the information consuming process CONSUME_PROC-1 is instructed not to start to consume from the first position in the queue QUEUE-001, but from the third position POS-003 in the queue QUEUE-001. For example, this instruction can be the result from an external process that triggers the execution of the information consuming process CONSUME_PROC-1. In another example, this instruction can also be a result from the information consuming process CONSUME_PROC-1 consuming from the queue QUEUE-001 according a consuming plan CP, depicted in FIG. 12.

The remaining messages may be consumed at a later time, for instance at a synchronized time or upon being triggered by the mentioned external process (e.g. with an instruction to now start from the first position).

Figure 12:
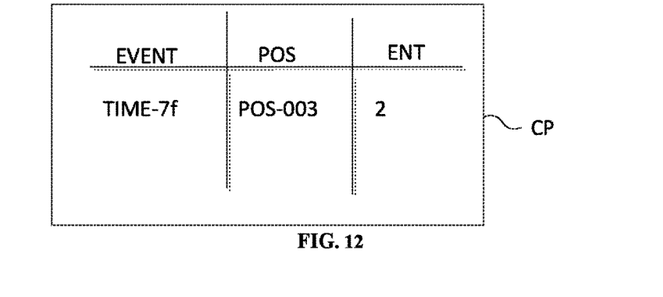
FIG. 12 depicts an example of an information consuming plan.

FIG. 12 depicts an information consuming plan CP that instructs the information consuming process CONSUME_PROC-1 upon arrival of some event EVENT to consume messages from a queue QUEUE, as for example from QUEUE-001 in FIG. 11. Optionally the information consuming plan CP may also specify the number of entries ENT from which the consuming process CONSUME_PROC-1 shall consume following the specified starting position POS. Optionally, the information consuming plan CP may also specify the last position from which the consuming process CONSUME_PROC-1 shall consume (not depicted).

Of course the invention is not limited to the above embodiments; rather, variations, additions and embodiments may be made within the scope of the invention. Also, it is understood that features may freely be exchanged between embodiments whenever this does not exceed the scope of the invention as described in the attached claims.

The invention claimed is:

1. A method for performing an information exchange between at least two processes (FEED_PROC-1, FEED_PROC-2, CONSUME_PROC-1) communicating with each other using at least one queue (QUEUE-001), the method comprising:

conducting at least one information feeding process (FEED_PROC-1, FEED_PROC-2) that places pieces of information (MESG-001, MESG-002, MESG-003, MESG-004) into the at least one queue (QUEUE-001); and conducting at least one information consuming process (CONSUME_PROC-1) that sequentially consumes the pieces of information (MESG-001, MESG-002, MESG-003, MESG-004) from the at least one queue (QUEUE-001);

wherein each piece of information comprises identifying information (F003, F004, F005, F006), wherein placing the pieces of information (MESG-001, MESG-002, MESG-003, MESG-004) from the at least one information feeding process (FEED_PROC-1, FEED_PROC-2) into the at least one queue (QUEUE-001) is done according to an a priori specified placement plan (PP), wherein the placement plan (PP) describes, for each of at least one possible value of the identifying information (MESG), a respective position (POS) where pieces of information of a message type as specified by the respective value of identifying information, or respective references thereto, are to be placed into the queue (QUEUE-001), wherein the pieces of information (MESG-001, MESG-002, MESG-003, MESG-004) or respective references thereto are placed into the at least one queue (QUEUE-001) at respective positions (POS) in the queue (QUEUE-001) as defined in the placement plan by the respective values of the identifying information (MESG) comprised in the pieces of information, and wherein the placement plan (PP) defines, for at least two values of identifying information (MESG-001, MESG-002), the same position (POS-001), and when information feeding processes (FEED PROC-1,FEED PROC-2) provide more than one piece of information (MESG-001, MESG-002) for the same position (POS-001), the queue (QUEUE-01) performs a replacement strategy for the pieces of information (MESG-001, MESG-002) to be placed into the same position.

2. The method according claim 1, wherein the placement plan (PP) defines multiple positions (POS-001, POS-002, POS-003, POS-004) for at least one value of the identifying information (MESG-001, MESG-002), and the corresponding pieces of information (MESG-001, MESG-002) or respective references thereto are placed at least at one of the multiple positions thus defined.

3. The method according to claim 2, wherein when a piece of information (MESG-001, MESG-002) or a respective reference thereto is placed at more than one position (POS-001, POS-002), the information consuming process (CONSUME_PROC-1) consumes the information (MESG-001, MESG-002) repeatedly, namely, a corresponding number of times.

4. The method according to claim 1, wherein the replacement strategy is one of the following: use the first, the second, or the last piece of information (MESG-001, MESG-002) having the respective values of identifying information and discard the other pieces of information.

5. The method according to claim 1, wherein the placement plan (PP) includes empty entries (EE-001) which are processed to generate a pause of execution of the information consuming process (CONSUME_PROC-1).

6. The method according to claim 1, wherein at least one information consuming process (CONSUME_PROC-1) is started at a configured point in time in a synchronized timebase.

7. The method according claim 6, wherein the synchronized timebase is established by one of the following synchronization standards: IEEE 802.1AS, IEEE 1588, SAE AS6802 or a standard that builds on said synchronization standards.

8. The method according to claim 1, wherein at least one information feeding process (FEED_PROC-1) is started at a configured point in time in a synchronized timebase.

9. The method according to claim 1, wherein the information consuming process (CONSUME_PROC-1) starts to consume from a position (POS) in the queue (QUEUE) other than the first position.

10. The method according claim 9, wherein the information consuming process (CONSUME_PROC-1) implements an information consumption plan (CP) that instructs the information consuming process of the starting position (POS) to consume messages and optionally also instructs of the number of entries (ENT) to consume following the starting position (POS).

11. The method according claim 10, wherein the information consumption plan (CP) uses the time reaching a configured point in time in a synchronized timebase as event (EVENT), to identify from which position (POS) the information consuming process (CONSUME_PROC-1) starts to consume information.

12. The method according to claim 1, wherein the pieces of information (MESG-001, MESG-002, MESG-003, MESG-004) exchanged using the one or many queues (QUEUE, QUEUE-001) are Ethernet frames or references representing Ethernet frames.

13. The method according to claim 1, wherein the placement plan (PP) describes positions (POS) in the queue for sequentially consuming messages from the queue.

\* \* \* \* \*